… …

United States Patent Office 3,687,768
Patented Aug. 29, 1972

3,687,768
METHOD OF MAKING A LAMINATED BOAT HULL
Allan Holmes Vaitses, Ocean Drive, Mattapoisett, Mass. 02739, and William Van Alan Clark, Jr., Marion, Mass.; said Clark assignor to said Vaitses
Filed Dec. 18, 1968, Ser. No. 784,742
Int. Cl. B29c 17/04
U.S. Cl. 156—212               9 Claims

ABSTRACT OF THE DISCLOSURE

A method of molding a compoundly-curved boat hull on a mold surface comprising the steps of laying up on the mold a first skin; placing upon the first skin a first set of substantially parallel spaced elongated members; laying a continuous membrane adhering to the exposed portions of the first skin; placing a second set of substantially parallel spaced elongated members upon the continuous membrane so as to substantially fill the interstitial valleys between the members of the first set; and laying up a second skin upon the second set of elongated members and upon the exposed portions of the continuous membrane to complete the hull.

---

Figure 1:
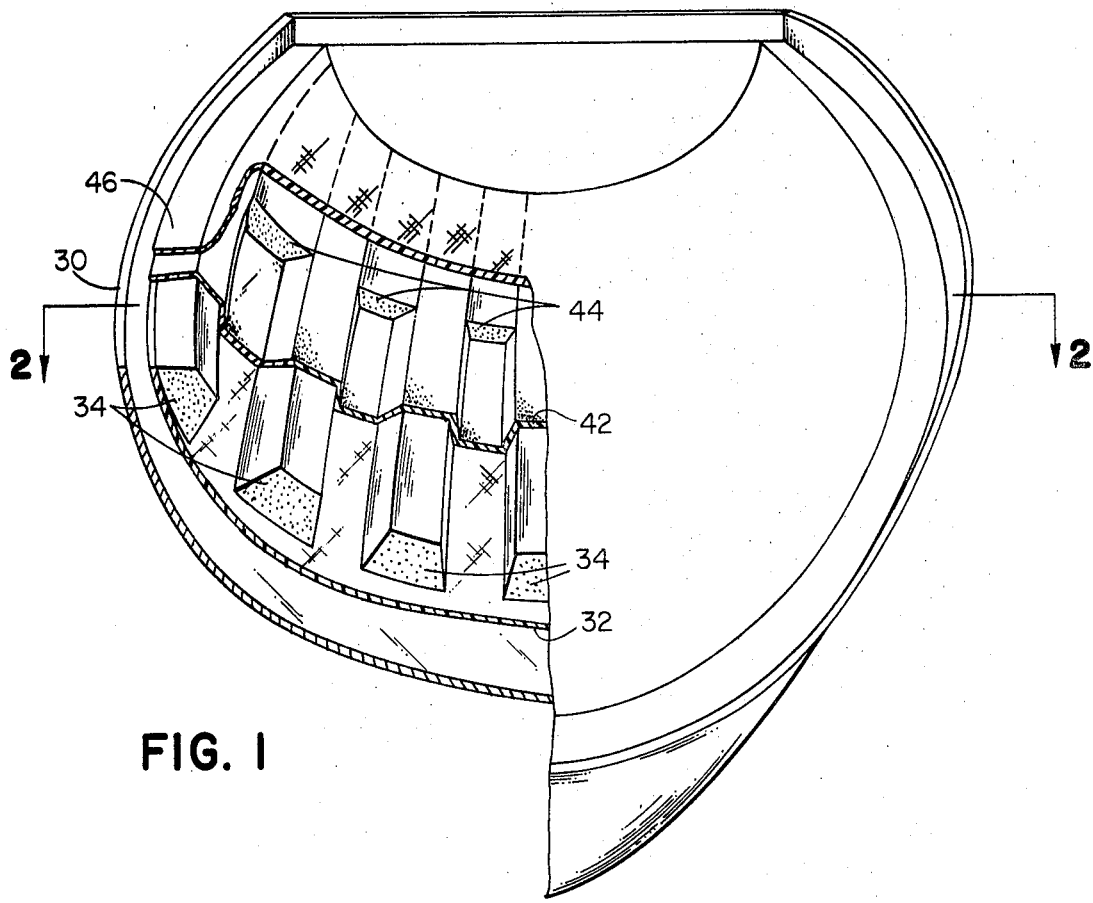

This invention relates to a method of molding compoundly-curved boat hulls and the boat hull thereof.

Compoundly-curved boat hulls of relatively complicated shape are conventionally molded by using one or more layers of a fabric of glass or synthetic fiber with a suitable settable synthetic resin. The resulting boat hull is quite light and is widely used, particularly in small boats.

However, in larger boats, especially in racing boats where weight is important, such conventional glass fiber-resin construction tends to be heavier than other types of construction. This is because the necessary increase in torsional rigidity of the hull can only be obtained at the expense of increased hull skin thickness and weight to a degree much greater than is necessary for surface resistance to puncture. As a result, a large number of interior hull reinforcing members must be used to achieve light weight, but, as these must be individually accurately shaped and fitted, the expense and time involved has been a major problem.

It is accordingly a major object of the invention to provide an efficient and economical method of compound shape boat hull construction which will yield a boat hull having great stiffness for the weight of the material used by spreading apart the inner and outer layers while maintaining a strong connection between them by the use of a multiplicity of regularly spaced interconnections strongly attached to said inner and outer layers.

Accordingly the invention features a novel method of molding a compoundly-curved boat hull on a mold surface comprising the steps of: laying up on a mold a first skin; placing on the first skin a first set of spaced members; laying a membrane adhering to the exposed portions of the first skin; placing a second members on the continous membrane substantially filling the interstitial valleys between the spaced members of the first set; and laying up on the second set of spaced members and on the exposed portions of the continuous membrane a second skin to complete the hull. The membrane material is preferably generally continuous and includes a settable resin in unset condition upon application, with the second set of spaced members being placed on the membrane while the resin thereof is in unset condition. Preferably, too, interfitting members are utilized in sets, temporarily fastened together, with all members identical, elongated and generally parallel to one another, and with flat parallel top and bottom surfaces and sloping sides, one of the parallel surfaces being shorter than the other but nevertheless of substantial transverse length relative thereto, providing skin area contact of between about 20 to 50 percent. The first and second skin materials may include conventional fiber fabrics containing tacky settable resins applied in unset condition. The settable resins are thereafter set and the hull separated from the mold surface to produce the novel compoundly-curved boat hull of the invention.

Figure 2:
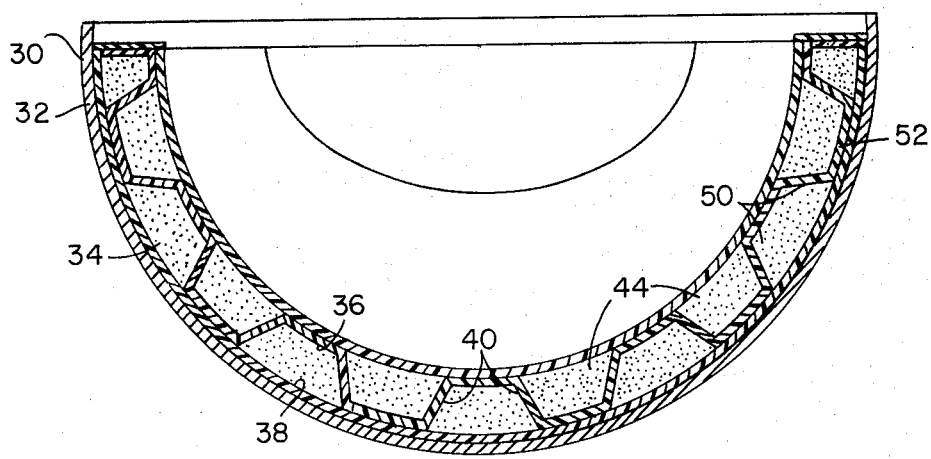

Other objects, features, and advantages of the invention will appear from the following description of a preferred embodiment, taken together with the attached drawings thereof, in which:

FIG. 1 is a partially broken away perspective view of a boat hull constructed according to the method of the invention; and FIG. 2 is a section at 2—2 of the boat hull of FIG. 1.

As shown in the drawings, the novel boat hull of the invention is constructed in accordance with the novel methods thereof by utilizing a conventional female mold 30 having the desired shape of compound curvature and constructed in any suitable manner known to the art. Within such mold is first laid up an outer skin 32. Such outer skin may comprise a fabric of glass or organic plastic fiber impregnated with a conventional settable resin such as polyester or epoxy which may, after laying up, be cured to set it by heat or otherwise. The building up of such skin is carried out by conventional techniques, expect that it may be much thinner, of the order of one quarter the thickness of the hull that would normally be required.

According to the present invention, on top of outer skin 32, preferably before the resin of said skin has been finally set, is positioned a set of relatively narrow, flexible elongated members 34 parallel to and spaced from one another, throughout the entire extent of the outer skin. Such members may extend either longitudinally of the hull, as shown, transversely, or in any other desired direction, their longitudinal flexibility permitting them to bend to conform to the hull shape, or they may be similarly tapered in thickness along their length if desired. Members 34 may be interrupted at any point it might be desirable directly to connect the inner and outer skins, or to insert other fillers of differing physical properties as for hull attachments or through-hull fittings. Preferably, each elongated member 34 is an isosceles trapezoid in transverse section having parallel top and bottom surfaces 36 and 38, respectively, and sloping sides 40. The bottom one 38 of the parallel surfaces in contact with outer skin 32 is longer than the top one 36, but the top one 36 is nevertheless of substantial transvearse width for reasons hereinafter set fourth. Each such elongated member 34 may be made of polyurehtane foam, extended polyvinyl chloride, segmented wood strips fastened together on a backing fabric, or other flexible light-weight filler material. In order to facilitate installation of the members 34 within the outer skin 32, the individual members of the set may be fastened together temporarily, spaced from one another to form a mat, as by tapes, strings, or any such fastening means, or removable spacer blocks may be used in assembling the members, or grids of such members, stamped or molded as a unit, preferably with offset connections therebetween, may be employed as suitable pretrimmed portions of the hull surface.

After removal of the fastening and spacing means from the set of spaced elongated members positioned on outer skin 32, in accordance with a major feature of the invention, a membrane member 42, preferably continuous and of a material suitable for producing a rigid, waved or corrugated structure is applied over the set of members 34 and the parallel, spaced strip portions of outer skin 32 exposed between the members 34. The membrane member 42 preferably is of the same resin-impregnated fabric of glass fibers or the like as is outer skin 32 of the hull, and has the resin portion thereof in unset condition for bonding to the exposed outer skin strip portions throughout the entire extent thereof. Its thickness is preferably somewhat less than that of outer skin 32. To assure good bonding of membrane 42 to the exposed strip portions of outer skin 32, it is desirable that the resin of skin 32 is not finally cured until after application of membrane 42, but such is not essential.

Preferably, while the resin of membrane 42 remains in relatively soft, unset condition, the interstitial valleys between the outer set of elongated members 34 are then filled by pressing a second set of elongated members 44 into said valleys, using, if desired, commercially available micro-balloon filler or the like to insure a good fit should the continuous membrane 42 prove to be locally irregular, to provide a relatively smooth inner surface. In the preferred embodiments illustrated, the elongated members 44 of the second set are of identical size, shape and spacing as the elongated members 34 of the first set, and hence fit accurately between them, bending longitudinally or being tapered as may be required to conform to the contour of outer skin 32, with their parallel surfaces of greater width exposed at the inner surface of the partially completed hull.

The final step is the laying up of the inner skin 46 on the exposed portions of the continuous membrane member 42 and the members 44 of the second set, preferably while the resin of the membrane material remains unset. The finished hull is thereafter separated from the mold surface. The inner skin 46 need not be as thick as the outer skin and may be, and preferably is, of the same composition as that of outer skin 32 and continuous membrane 42. It may be finally cured after its application to membrane material 42. A convenient way to accomplish all of such curing is to perform any desired prior steps in a cool environment and then apply heat to the entire structure as a final step in curing to produce the finished hull.

It should be especially noted that the use of a second set of elongated members 44 to fill the interstitial valleys between the members 34 of the first set is the key to an efficient and simple application of the inner skin 46, since, by so doing, the exposed surfaces of members 44 and of continuous membrane 42 provide a continuous surface for convenient application of the glass fiber fabric and resin comprising inner skin 46. In addition, the preferred isosceles trapezoid shape of said members not only makes it easy to assemble the second set of members on the membrane overlying the first set of members, but forms alternately sloping interconnecting membrane portions 50 with flat and comparatively wide connecting portions 52 therebetween which increase the torsional rigidity of the hull by providing a bond of great strength between the inner and outer skins. It has been found that for convenience and ease of construction, as well as for adequate bonding, the percentage of the total area of either the inner skin 46 or the outer skin 32 which is bonded to the connecting portions 52 of membrane member 42 must be at least about 20% and, of course, not greater than 50%. Best results are obtained if these limits are further narrowed to about 30% and about 45%, the construction shown herein being about 35%.

It will be seen that the process described provides a novel boat hull, comprising inner and outer skins, 46 and 32, each bonded throughout a strip of substantial width to a corrugated or waved internal reinforcing structure 42, which is not only easy to construct and which readily follows the contours of complex curviform molds, but which also provides an extremely light, puncture resistant and torsionally rigid structure by reason of its relatively thin but strong skins and high beam thickness.

Other embodiments will occur to those skilled in the art and are within the following claims.

What is claimed is:

1. The method of molding a compoundly-curved shape on a mold surface comprising the steps of:
   laying up on said mold a first skin material,
   placing on said skin material a settable resin in unset tacky condition,
   placing on said first skin material a first set of members spaced from one another generally throughout said mold surface,
   laying a membrane material on said first set of spaced elongated members and on the exposed portions of said first skin in contact therewith providing a generally waved cross-sectional configuration thereof,
   placing a second set of spaced members on said membrane material substantially filling the interstitial valleys between the spaced elongated members of said first set,
   laying up on said second set of said spaced elongated members and on the exposed portions of said continuous membrane a second skin material,
   setting said materials and separating said set shape from said mold surface.

2. The method as claimed in claim 1, wherein said membrane material comprises a fabric of glass fibers having a settable resin in unset tacky condition.

3. The method of molding a compoundly-curved boat hull on a mold surface comprising the steps of:
   laying up on said mold a first skin material,
   placing on said first skin material a first set of elongated members spaced from and generally parallel to one another
   laying a membrane material having a settable resin in unset tacky condition on said first set of spaced elongated members and on the exposed portions of said first skin in contact therewith providing a generally corrugated cross-sectional configuration thereof,
   placing a second set of spaced elongated members on said membrane material substantially filling the interstitial valleys between the spaced elongated members of said first set;
   laying up on said second set of said spaced elongated members and on the exposed portions of said continuous membrane a second skin material,
   setting said resin, and
   separating said hull from said mold surface.

4. The method as claimed in claim 3 wherein said second set of spaced members is placed on said membrane material while said resin is in unset tacky condition.

5. The method as claimed in claim 3, wherein said first and second sets of elongated members have parallel top and bottom surfaces and sloping sides, one of said parallel surfaces being shorter than the other but nevertheless of substantial transverse length relative thereto.

6. The method as claimed in claim 5 wherein the individual elongated members of said first and second sets all have the same cross section.

7. The method as claimed in claim 5 wherein the area of each of said first skin and said second skin in contact with said membrane material comprises between about 20% and about 50% of the total area of each of said first and second skins.

8. The method of molding a compoundly-curved boat hull on a mold surface comprising the steps of:
   laying up on said mold a first skin material having a settable resin in unset tacky condition
   placing on said first skin material while said first skin material resin is in unset tacky condition a first set of elongated members spaced from and generally parallel to one another and extending generally throughout said mold surface,
   laying a continuous membrane material having a settable resin in unset tacky condition on said first set of set of spaced elongated members and on the exposed portions of said first skin in contact therewith providing a generally corrugated cross-sectional configuration thereof, placing a second set of spaced elongated members on said continuous membrane material while said membrane material resin is in unset tacky condition substantially filling the interstitial valleys between the spaced elongated members of said first set;

laying up on said second set of said spaced elongated members and on the exposed portions of said continous membrane a second skin material, setting said resin, and separating said hull from said mold surface.

9. The method as claimed in claim 8 wherein said second skin material includes a settable resin in unset condition.

References Cited
UNITED STATES PATENTS

| | | | |
|---|---|---|---|
| 3,239,590 | 3/1966 | Trimble | 156—245 X |
| 3,284,260 | 11/1966 | Best | 156—242 X |
| 3,427,689 | 2/1969 | Windecker | 156—245 X |

CARL D. QUARFORTH, Primary Examiner

S. J. LECHERT Jr., Assistant Examiner

U.S. Cl. X.R.

156—245, 293, 300

UNITED STATES PATENT OFFICE
CERTIFICATE OF CORRECTION

Patent No. 3,687,768          Dated August 29, 1972

Inventor(s)  A. H. Vaitses et al.

It is certified that error appears in the above-identified patent and that said Letters Patent are hereby corrected as shown below:

Col. 1, line 60, after "second" insert --set of spaced--.

Col. 2, line 29, before "skin" insert --outer--;
line 53, "fourth" should be --forth--.

Claim 8, line 74, delete "of set" at beginning of line.

Signed and sealed this 30th day of January 1973.

(SEAL)
Attest:

EDWARD M. FLETCHER, JR.          ROBERT GOTTSCHALK
Attesting Officer                Commissioner of Patents